United States Patent
Mukae et al.

(10) Patent No.: US 11,554,687 B2
(45) Date of Patent: Jan. 17, 2023

(54) POWER SUPPLY SYSTEM AND MANAGEMENT DEVICE CAPABLE OF DETERMINING CURRENT UPPER LIMIT FOR SUPRESSING CELL DETERIORATION AND ENSURING SAFETY

(71) Applicant: SANYO Electric Co., Ltd., Osaka (JP)

(72) Inventors: Hidetsugu Mukae, Hyogo (JP); Masayuki Yoshinaga, Hyogo (JP); Yoshitaka Sakiyama, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 0 days.

(21) Appl. No.: 17/267,317

(22) PCT Filed: Jul. 26, 2019

(86) PCT No.: PCT/JP2019/029350
§ 371 (c)(1),
(2) Date: Feb. 9, 2021

(87) PCT Pub. No.: WO2020/066260
PCT Pub. Date: Apr. 2, 2020

(65) Prior Publication Data
US 2021/0339651 A1 Nov. 4, 2021

(30) Foreign Application Priority Data
Sep. 27, 2018 (JP) .............................. JP2018-181657

(51) Int. Cl.
*B60L 58/16* (2019.01)
*B60L 50/64* (2019.01)
(Continued)

(52) U.S. Cl.
CPC ............... *B60L 58/16* (2019.02); *B60L 50/64* (2019.02); *B60L 58/24* (2019.02); *H02J 7/0013* (2013.01);
(Continued)

(58) Field of Classification Search
CPC ........... B60L 58/12; B60L 58/16; B60L 58/24
See application file for complete search history.

(56) References Cited

U.S. PATENT DOCUMENTS 9,071,072 B2* 6/2015 Tamezane ............... B60L 58/14
11,218,012 B2* 1/2022 Kusumi .............. H02J 7/00714
(Continued)

FOREIGN PATENT DOCUMENTS

JP 2010-200574 9/2010
JP 2010-210457 9/2010
(Continued)

OTHER PUBLICATIONS

International Search Report of PCT application No. PCT/JP2019/029350 dated Oct. 15, 2019.

*Primary Examiner* — Adi Amrany
(74) *Attorney, Agent, or Firm* — WHDA, LLP

(57) ABSTRACT

Power supply system mounted in electric vehicle includes voltage measurement unit that measures a voltage of each of a plurality of cells to ensure both safety of an electric vehicle and convenience of a user. Current measurement unit therein measures a current flowing through the plurality of cells. Temperature measurement unit therein measures a temperature of the plurality of cells. Controller therein determines a current limit value defining an upper limit of a current for suppressing cell deterioration and ensuring safety based on the voltage, the current, and the temperature of each of the plurality of cells measured by voltage measurement unit, current measurement unit, and temperature measurement unit respectively, and that notifies a higher-level controller in electric vehicle of the determined current limit value.

8 Claims, 10 Drawing Sheets

(51) Int. Cl.
  B60L 58/24 (2019.01)
  H02J 7/00 (2006.01)
  H02J 7/02 (2016.01)
  B60K 6/28 (2007.10)
(52) U.S. Cl.
  CPC .............. H02J 7/0048 (2020.01); H02J 7/02 (2013.01); B60K 6/28 (2013.01); B60Y 2200/91 (2013.01); B60Y 2200/92 (2013.01); H02J 7/005 (2020.01)

(56) References Cited

U.S. PATENT DOCUMENTS

| | | | |
|---|---|---|---|
| 2010/0185405 A1* | 7/2010 | Aoshima | B60L 50/64 |
| | | | 702/63 |
| 2011/0204850 A1* | 8/2011 | Kaino | H02J 7/007182 |
| | | | 320/162 |
| 2012/0004875 A1* | 1/2012 | Maeda | H01M 10/486 |
| | | | 702/63 |
| 2013/0002200 A1* | 1/2013 | Kobayashi | H02J 7/045 |
| | | | 320/112 |
| 2014/0015454 A1 | 1/2014 | Kunimitsu et al. | |
| 2014/0111164 A1* | 4/2014 | Ohkawa | B60L 50/40 |
| | | | 320/134 |
| 2018/0024172 A1* | 1/2018 | Katrak | H02J 7/0013 |
| | | | 307/130 |
| 2018/0024200 A1* | 1/2018 | Hiwa | G01R 31/3842 |
| | | | 702/63 |
| 2018/0056983 A1* | 3/2018 | Yang | H02J 7/0026 |
| 2018/0069272 A1* | 3/2018 | Seo | H02J 7/00 |
| 2018/0252774 A1* | 9/2018 | Ciaccio | B60L 1/02 |
| 2019/0023132 A1* | 1/2019 | Yonemoto | B60L 58/12 |
| 2019/0288344 A1* | 9/2019 | Nakao | B60L 3/0046 |
| 2020/0003844 A1* | 1/2020 | Lim | H02J 7/0048 |
| 2020/0033416 A1* | 1/2020 | Takegami | G01R 31/3842 |
| 2020/0096573 A1* | 3/2020 | Cha | H01M 10/425 |
| 2021/0339650 A1* | 11/2021 | Hashimoto | H01M 10/425 |

FOREIGN PATENT DOCUMENTS

| | | |
|---|---|---|
| JP | 2014-138528 | 7/2014 |
| WO | 2012/132178 | 10/2012 |
| WO | 2014/027389 | 2/2014 |

* cited by examiner

FIG. 2

| Anomaly occurrence place | | | | Alternative strategy | Fail-safe action |
|---|---|---|---|---|---|
| Comparative example | Cell anomaly due to control anomaly on vehicle side | | | — | Relay cut off after detection of overcharge, overdischarge, or overheat |
| | Circuit anomaly | | | — | Relay cut off after detection of anomaly |
| Example | Cell anomaly due to control anomaly on vehicle side | | | Use alternative value | Current limit value is zero |
| | Circuit anomaly | Main and redundant functions | | | Degenerate mode after detection of anomaly |
| | | Main function | | Replaced with redundant function | Degenerate mode after detection of anomaly |
| | | Redundant function | | Operate with only main function | Degenerate mode after detection of anomaly |

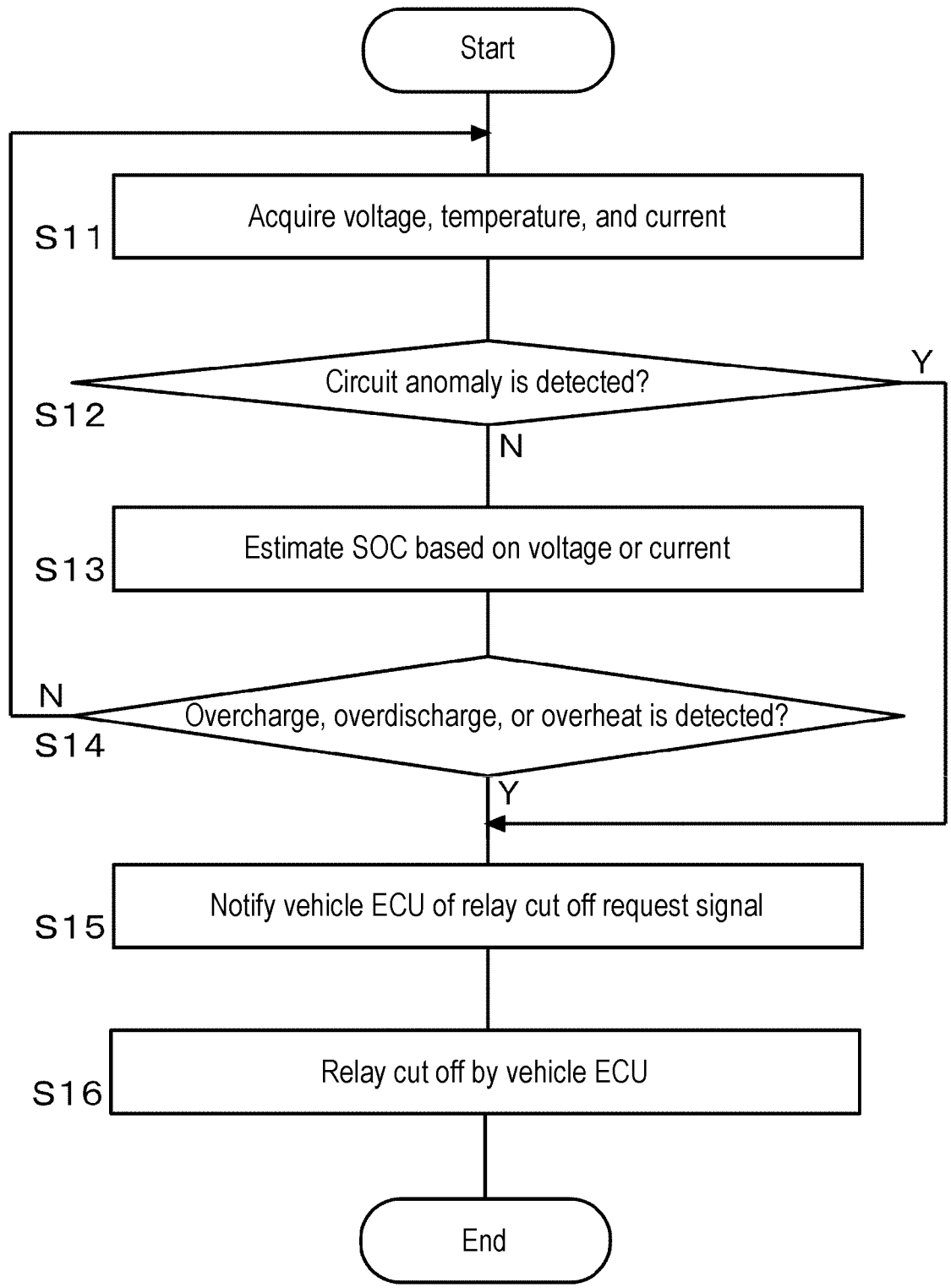

FIG. 6

| Function | | Anomaly place | Typical anomaly mode | Alternative strategy | Fail-safe action |
|---|---|---|---|---|---|
| Voltage measurement | | 13a,13b | Power supply anomaly of ASIC SPI communication anomaly | Replaced with voltage value of another measurement unit Limit SOC usage range | Degenerate mode |
| | Measurement system | 13a | Output sticking of A/D convertor | Use monitoring system data | Degenerate mode |
| | Monitoring system | 13b | Output sticking of A/D convertor | — | Degenerate mode |
| Temperature measurement | | 14a | Output sticking of thermistor Output drift anomaly | Replaced with temperature estimated by normal thermistor, or add offset to measurement value | Degenerate mode |
| Current measurement | | 15a,15b | Power supply anomaly of current sensor | SOC estimation by battery voltage measurement function | Degenerate mode |
| | High range | 15a | Output sticking of current sensor Offset anomaly of current sensor | Limit input-output current in low range, and use low range data | Degenerate mode |
| | Low range | 15b | Output sticking of current sensor Offset anomaly of current sensor | Use only high range data | Degenerate mode |
| Battery state determination | | 16 | Anomaly of CPU (ALU, ROM, and RAM) | — | Relay cut off |
| Vehicle communication | Main | 20a | Cut of CAN bus Communication timeout | Control vehicle using data on sub side | Caution lamp |
| | Sub | 20b | Cut of CAN bus Communication timeout | Control vehicle using data on main side | Caution lamp |

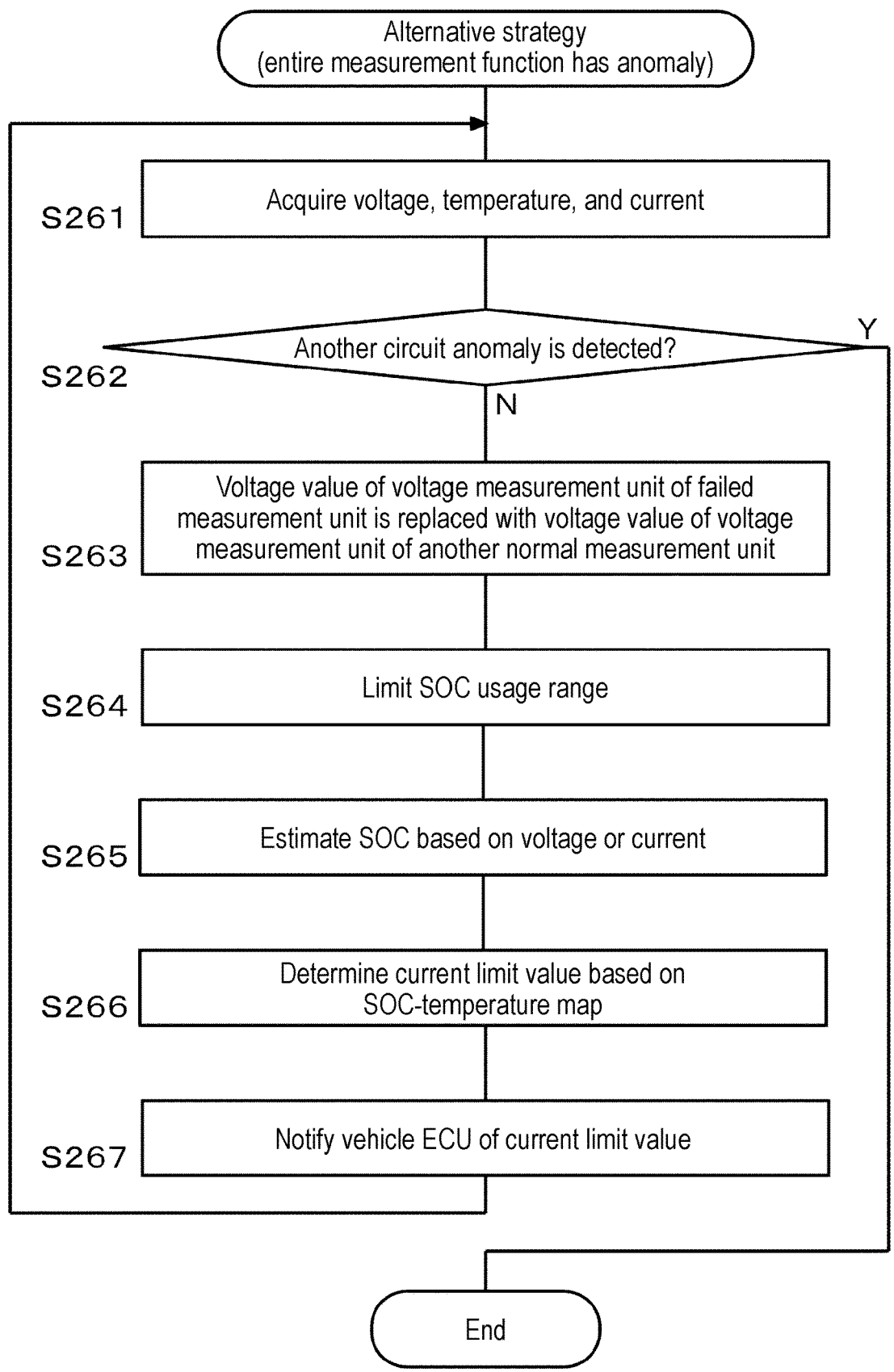

POWER SUPPLY SYSTEM AND MANAGEMENT DEVICE CAPABLE OF DETERMINING CURRENT UPPER LIMIT FOR SUPRESSING CELL DETERIORATION AND ENSURING SAFETY

CROSS-REFERENCE TO RELATED APPLICATIONS

This application is a U.S. national stage application of the PCT International Application No. PCT/JP2019/029350 filed on Jul. 26, 2019, which claims the benefit of foreign priority of Japanese patent application No. 2018-181657 filed on Sep. 27, 2018, the contents all of which are incorporated herein by reference.

TECHNICAL FIELD

The present invention relates to a power supply system and a management device that are mounted on an electric vehicle.

BACKGROUND ART

In recent years, hybrid vehicles (HVs), plug-in hybrid vehicles (PHVs), and electric vehicles (EVs) have become popular. These electric vehicles are each equipped with a power supply system provided with a secondary battery as a key device.

When the power supply system causes overcharging, overdischarging, or overheating, a protection function (hereinafter referred to as relay cut off) operates to open a contactor relay installed between the power supply system and an inverter that drives a running motor. The relay cut off is also activated when a measurement circuit for detecting overcharge, overdischarge, or overheat (e.g., a voltage measurement circuit, a current measurement circuit, or a temperature measurement circuit) has an anomaly (e.g., refer to PTL 1).

CITATION LIST

Patent Literature

PTL 1: International Publication No. WO 2012/132178

SUMMARY OF THE INVENTION

Even when the relay cut off is activated, a hybrid vehicle (HV) or a plug-in hybrid vehicle (PHV) can travel using an engine. However, a pure electric vehicle (EV) without an engine cannot travel when the relay cut off is activated. An electric vehicle (EV) equipped with the above protection function cannot travel when the measurement circuit has an anomaly, even with a battery itself having no anomaly, and thus the vehicle cannot be moved by itself to a car dealer or a repair shop.

The present invention is made in view of such a situation, and it is an object of the present invention to provide a technique for ensuring both safety of an electric vehicle and convenience of a user.

To solve the above problems, a power supply system according to an aspect of the present invention is mounted on an electric vehicle and includes a power storage unit connected to a plurality of cells, a voltage measurement unit that measures a voltage of each of the plurality of cells, a current measurement unit that measures a current flowing through each of the plurality of cells, a temperature measurement unit that measures a temperature of each of the plurality of cells, and a controller that determines a current limit value defining an upper limit of a current for suppressing cell deterioration and ensuring safety based on the voltage, the current, and the temperature of each of the plurality of cells measured by the voltage measurement unit, the current measurement unit, and the temperature measurement unit, respectively, and that notifies a higher-level controller in the electric vehicle of the determined current limit value.

Any combination of the components described above and a conversion of expression of the present invention between methods, devices, systems, and the like are also effective as aspects of the present invention.

According to the present invention, both safety of the electric vehicle and convenience of a user can be ensured.

BRIEF DESCRIPTION OF DRAWINGS

FIG. 2 is a diagram summarizing alternative strategies and fail-safe actions when a power supply system has an anomaly in a comparative example and an example.

FIG. 3 is a flowchart for illustrating a protection function of a power supply system according to the comparative example.

FIG. 6 is a diagram summarizing alternative strategies and fail-safe actions when a power supply system has an anomaly in the example.

FIG. 7 is a flowchart for illustrating a protection function of a power supply system after transition to an alternative strategy caused when an anomaly occurs throughout a voltage measurement function.

DESCRIPTION OF EMBODIMENT

Figure 1:
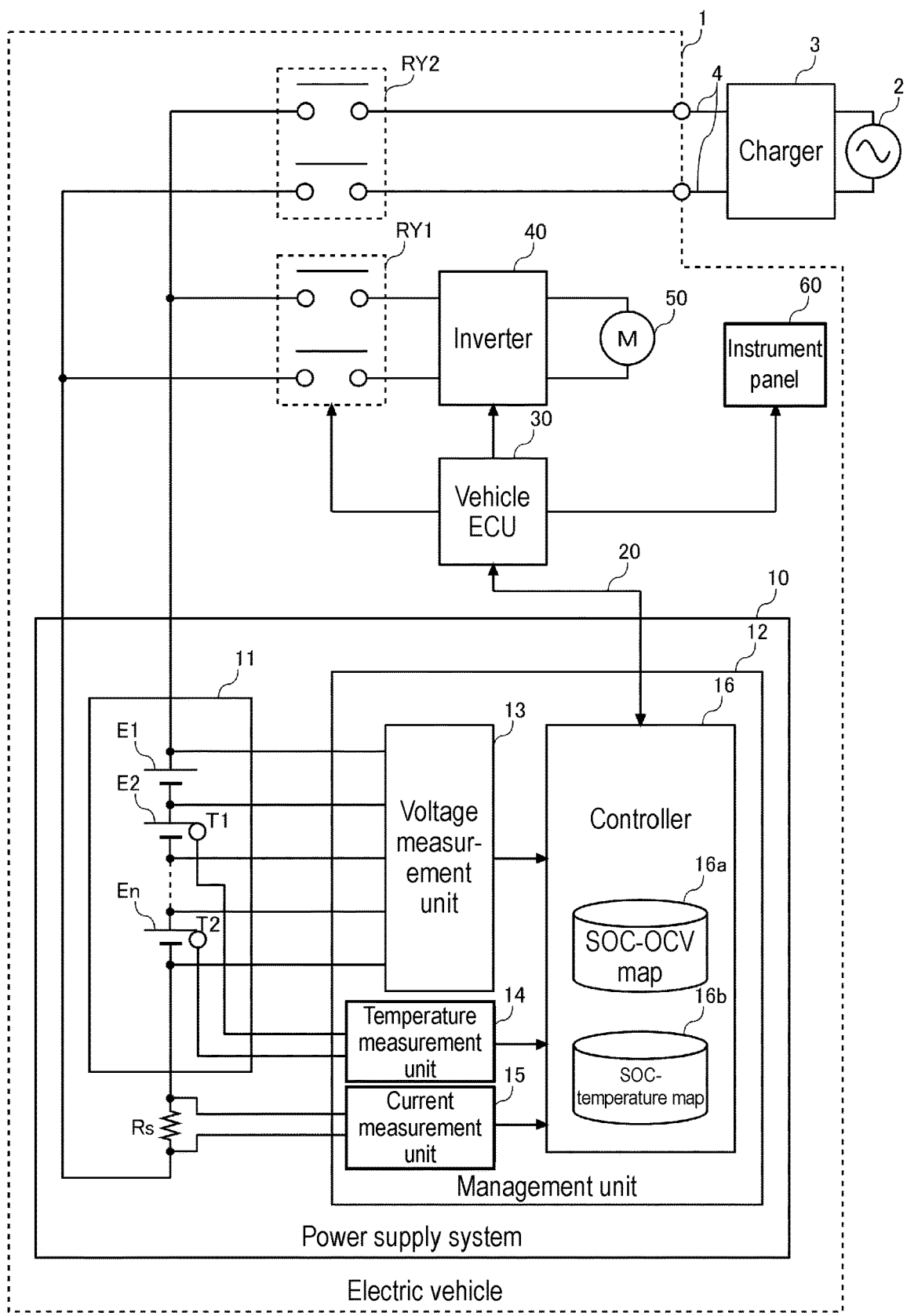
FIG. 1 is a diagram for illustrating an electric vehicle equipped with a power supply system according to an exemplary embodiment of the present invention.

FIG. 1 is a diagram for illustrating electric vehicle 1 equipped with power supply system 10 according to an exemplary embodiment of the present invention. Electric vehicle 1 is assumed to be an EV that can be charged from charger 3 installed outside.

Power supply system 10 is connected to motor 50 through first relay RY1 and inverter 40. Inverter 40 converts DC power supplied from power supply system 10 into AC power and supplies it to motor 50 during power running. At the time of regeneration, the AC power supplied from motor 50 is converted into DC power and supplied to power supply system 10. Motor 50 is a three-phase AC motor, and rotates in accordance with the AC power supplied from inverter 40 during power running. At the time of regeneration, rotational energy due to deceleration is converted into AC power and supplied to inverter 40.

First relay RY1 is a contactor inserted between wiring connecting power supply system 10 and inverter 40. Vehicle ECU 30 controls first relay RY1 in an on-state (closed state) during traveling, and electrically connects power supply system 10 and a power system of electric vehicle 1. Vehicle ECU 30 controls first relay RY1 in an off-state (open state) during non-traveling in principle, and electrically interrupts power supply system 10 and the power system of electric vehicle 1. Instead of the relay, another type of switch such as a semiconductor switch may be used.

Power supply system 10 can be charged from commercial power system 2 when being connected to charger 3 installed outside electric vehicle 1 with charging cable 4. Charger 3 is installed in homes, car dealers, service areas, commercial facilities, public facilities, and the like. Charger 3 is connected to commercial power system 2 and charges power supply system 10 in electric vehicle 1 using charging cable 4. In electric vehicle 1, second relay RY2 is inserted between wiring connecting power supply system 10 and charger 3. Instead of the relay, another type of switch such as a semiconductor switch may be used. Vehicle ECU 30 controls second relay RY2 in the on-state (closed state) before start of charging, and in the off-state (open state) after the charging is completed.

In general, normal charging uses an alternating current for charging and quick charging uses a direct current for charging. When an alternating current is used for charging, AC power is converted to DC power by an AC/DC converter (not illustrated) inserted between second relay RY2 and power supply system 10.

Power supply system 10 includes power storage unit 11 and management unit 12, and power storage unit 11 includes a plurality of cells E1 to En connected in series. More specifically, power storage unit 11 includes one or more power storage modules. The one or more power storage modules are connected in series and series-parallel. Each of the power storage modules includes a plurality of cells connected in series and series-parallel. For each of the cells, a lithium ion battery cell, a nickel hydrogen battery cell, a lead battery cell, an electric double layer capacitor cell, a lithium ion capacitor cell, or the like is available. Hereinafter, in the present specification, an example using a lithium ion battery cell (having a nominal voltage of 3.6 V to 3.7 V) is assumed. A number of series of cells E1 to En is determined in accordance with a drive voltage of motor 50.

The plurality of cells E1 to En is connected to shunt resistor Rs in series. Shunt resistor Rs functions as a current detection element. Instead of shunt resistor Rs, a Hall element may be used. Power storage unit 11 is provided inside with a plurality of temperature sensors T1, T2 for detecting temperature of the plurality of cells E1 to En. One temperature sensor may be provided for each of the power storage modules, or one temperature sensor may be provided for each of the plurality of cells. For example, a thermistor can be used for each of temperature sensors T1, T2.

Management unit 12 includes voltage measurement unit 13, temperature measurement unit 14, current measurement unit 15, and controller 16. Each of nodes of respective cells E1 to En connected in series is connected to voltage measurement unit 13 with corresponding one of voltage lines. Voltage measurement unit 13 measures a voltage of each of cells E1 to En by measuring a voltage between two adjacent voltage lines. Voltage measurement unit 13 transmits the measured voltage of each of cells E1 to En to controller 16.

Voltage measurement unit 13 has a higher voltage than controller 16, so that voltage measurement unit 13 and controller 16 are connected with a communication line in an insulated state. Voltage measurement unit 13 can be composed of an application specific integrated circuit (ASIC) or a general-purpose analog front-end integrated circuit (IC). Voltage measurement unit 13 includes a multiplexer and an A/D converter. The multiplexer outputs the voltage between two adjacent voltage lines to the A/D converter in order from the top. The A/D converter converts an analog voltage received from the multiplexer into a digital value.

Temperature measurement unit 14 includes a voltage dividing resistor and an A/D converter. The A/D converter sequentially converts a plurality of analog voltages divided by the plurality of temperature sensors T1, T2 and a plurality of voltage dividing resistors into digital values and outputs them to controller 16. Controller 16 estimates temperatures of the plurality of cells E1 to En based on the digital values. For example, controller 16 estimates a temperature of each of the cells E to En based on a value measured by the temperature sensor closest to the corresponding one of cells E1 to En.

Current measurement unit 15 includes a differential amplifier and an A/D converter. The differential amplifier amplifies a voltage across shunt resistor Rs and outputs the voltage to the A/D converter. The A/D converter converts the voltage received from the differential amplifier into a digital value and outputs the digital value to controller 16. Controller 16 estimates a current flowing through the plurality of cells E1 to En based on the digital value.

When an A/D converter is mounted in controller 16 and an analog input port is provided in controller 16, temperature measurement unit 14 and current measurement unit 15 may output analog voltages to controller 16, and the A/D converter in controller 16 may convert the analog voltages into digital values.

Controller 16 manages a state of each of the plurality of cells E1 to En based on the voltage, temperature, and current of the corresponding one of the plurality of cells E1 to En measured by voltage measurement unit 13, temperature measurement unit 14, and current measurement unit 15, respectively. Controller 16 and vehicle ECU 30 are connected through in-vehicle network 20. In-vehicle network 20 is constructed using at least one of the standards such as a controller area network (CAN), a local interconnect network (LIN), FlexRay (registered trademark), and Ethernet (registered trademark). Hereinafter, in the present exemplary embodiment, an example is assumed in which the CAN is used for in-vehicle network 20.

Controller 16 can be composed of a microcomputer and a non-volatile memory (e.g., an electrically erasable programmable read-only memory (EEPROM), or a flash memory). In the non-volatile memory, state of charge (SOC)-open circuit voltage (OCV) map 16a and SOC-temperature map 16b are held. SOC-OCV map 16a describes characteristic data on SOC-OCV curves of the plurality of cells E1 to En.

SOC-temperature map 16b defines a relationship between an SOC and a temperature of a cell, and a current limit value.

The current limit value defines an upper limit value of a current recommended for suppressing deterioration of a cell. A battery manufacturer determines a recommended current limit value for each of various combinations of an SOC and a temperature of a cell based on numerical simulations and experiments in advance, and maps a relationship between them. The recommended current limit value is set to, for example, a current value for avoiding progress of deterioration faster than an average life curve of a cell. The recommended current limit value is set separately for each of a charge current and a discharge current. SOC-temperature map 16b generated by the battery manufacturer is registered in the non-volatile memory in controller 16.

The relationship between the SOC and temperature of the cell, and the recommended current limit value may be defined as a function. Also in that case, the derived function is registered in the non-volatile memory in controller 16. Instead of the recommended current limit value, a recommended power limit value may be used.

Controller 16 estimates the SOC and a state of health (SOH) of each of the plurality of cells E1 to En. Controller 16 estimates the SOC by combining an OCV method and a current integration method. The OCV method is configured to estimate the SOC based on OCV of each of the cells E1 to En measured by voltage measurement unit 13 and the characteristic data on the SOC-OCV curve described in SOC-OCV map 16a. The current integration method is configured to estimate the SOC based on the OCV at the start of charging and discharging of each of cells E1 to En and an integrated value of a current measured by current measurement unit 15. In the current integration method, a measurement error of current measurement unit 15 accumulates as charging and discharging time increases. Thus, the estimated SOC by the current integration method needs to be corrected using the estimated SOC by the OCV method.

The SOH is defined as a ratio of current full charge capacity to initial full charge capacity, and the SOH having a lower value (closer to 0%) indicates that deterioration progresses more. The SOH may be acquired by measuring capacity by complete charge and discharge, or may be acquired by adding storage deterioration and cycle deterioration. The storage deterioration can be estimated based on the SOC, the temperature, and a storage deterioration rate. The cycle deterioration can be estimated based on a SOC range used, a temperature, a current rate, and a cycle deterioration rate. The storage deterioration rate and the cycle deterioration rate can be derived in advance by experiments or simulations. The SOC, the temperature, the SOC range, and the current rate can be determined by measurement.

The SOH can also be estimated based on a correlation with internal resistance of each of the cells. The internal resistance can be estimated by dividing a voltage drop caused by allowing a predetermined current to flow through the corresponding one of the cells for a predetermined time by the current value. The internal resistance decreases as the temperature rises, and increases as the SOH decreases.

Controller 16 notifies vehicle ECU 30 of a state of each of the plurality of cells E1 to En through in-vehicle network 20. For example, controller 16 totals the SOCs of the plurality of cells E1 to En to calculate the SOC of the whole of power storage unit 11, and notifies vehicle ECU 30 of the calculated SOC of the whole of power storage unit 11. Controller 16 also notifies vehicle ECU 30 of a voltage applied to power storage unit 11 and a current flowing through power storage unit 11, in real time. Vehicle ECU 30 notifies vehicle ECU 30 of the current limit value described above.

Vehicle ECU 30 controls the whole of electric vehicle 1. Vehicle ECU 30 may be composed of, for example, an integrated vehicle control module (VCM). In electric vehicle 1, instrument panel 60 is disposed facing a driver's seat. Instrument panel 60 includes a tachometer, a speedometer, and various telltale lamps. The teller tail lamps include a caution lamp indicating an anomaly in equipment in electric vehicle 1. For example, a caution lamp indicating an anomaly in power supply system 10 and a caution lamp indicating an anomaly in in-vehicle network 20 are included.

When vehicle ECU 30 receives notification that an anomaly has occurred in any equipment in electric vehicle 1 through in-vehicle network 20, vehicle ECU 30 turns on the corresponding caution lamp on instrument panel 60. When a caution lamp requiring repair of equipment lights up, a driver moves to a car dealer or a repair shop with the vehicle itself when the vehicle can travel. When the vehicle cannot travel, the driver uses road service.

FIG. 2 is a diagram summarizing alternative strategies and fail-safe actions when power supply system 10 has an anomaly in a comparative example and an example. As described later, the fail-safe action of the comparative example is suitable for controlling a hybrid vehicle (HV) and a plug-in hybrid vehicle (PHV), and the fail-safe action of the example is suitable for controlling a pure electric vehicle (EV) without an engine. In the comparative example, when any of overcharge, overdischarge, and overheat is detected in a cell by external control from a vehicle to power supply system 10, controller 16 transmits a relay cut off request to vehicle ECU 30 through in-vehicle network 20. When receiving the relay cut off request, vehicle ECU 30 turns off first relay R1.

Controller 16 compares the voltage of each of the cells measured by voltage measurement unit 13 with an OV threshold value for detecting overvoltage, and determines that a cell having a voltage higher than the OV threshold value is overcharged. Controller 16 also compares the voltage of each of the cells measured by voltage measurement unit 13 with a UV threshold value for detecting undervoltage, and determines that a cell having a voltage lower than the UV threshold value is overdischarged. The OV threshold value is typically set to a value lower than an upper limit of a working voltage of a cell by a protection margin. The UV threshold value is typically set to a value higher than a lower limit of the working voltage of the cell by the protection margin. Controller 16 compares the temperature of each of the cells measured by temperature measurement unit 14 with an OT threshold value for detecting overtemperature (OT), and determines that a cell having a temperature higher than the OT threshold value is excessively increased in temperature.

In the comparative example, also when a circuit that implements a cell protection function (specifically, voltage measurement unit 13, temperature measurement unit 14, or current measurement unit 15) has an anomaly, controller 16 transmits the relay cut off request to vehicle ECU 30. As described above, the fail-safe action of the comparative example can prevent use of battery system 10 in an uncertain state by performing relay cut off when any of the measurement units fails. In particular, hybrid vehicles (HVs) and plug-in hybrid vehicles (PHVs) each can travel using an engine, so that relay cut off performed as a fail-safe action for an anomaly having occurred in the circuit causes little inconvenience. Thus, the fail-safe action of the comparative example is suitable for controlling a battery system mounted on this type of vehicle.

However, a pure electric vehicle (EV) without an engine may not be stopped in a safe place when power supply system 10 suddenly stops. Even when the vehicle can be stopped in a safe place, the vehicle cannot travel by itself after that, and thus reducing convenience of a user. Thus, a pure electric vehicle (EV) is required to achieve both ensuring vehicle safety and continuing basic performance (running, turning, stopping).

In the example, an anomaly of a cell is detected with a current limit (hereinafter, also referred to as a power limit as appropriate) using SOC-temperature map 16b.

The power limit using the SOC-temperature map is a value indicating an allowable current value from the viewpoint of suppressing cell deterioration. The power limit using the SOC-temperature map only indicates a recommended value for suppressing cell deterioration in conventional power supply systems and electric vehicles, so that whether the vehicle ECU executes the power limit in accordance with a current limit value transmitted from the controller to the vehicle ECU is left to a design concept of a vehicle manufacturer. A typical vehicle ECU of a conventional electric vehicle controls charge and discharge such that the power limit is executed when an economic mode for emphasizing battery life is selected, and the power limit is not executed when a normal mode without traveling restriction is selected.

In contrast, the example is configured such that a power limit signal transmitted from the power supply system is treated as an abnormal signal. Specifically, the vehicle ECU is configured such that when the power limit signal indicating a value at which the current limit value is zero is received, relay cut off is executed when safety can be checked from another data acquired by the vehicle ECU. This enables the example to determine an anomaly of a cell before an abnormal state such as OV, UV, or OT occurs by detecting the anomaly of the cell with the power limit using SOC-temperature map 16b. What is especially important is that a boundary related to both the SOC and the temperature can be identified by treating the power limit as an abnormal signal, and thus enabling multiple anomalies, which are conventionally determined individually as OV, UV or OT, to be integrated and evaluated.

Figure 5:
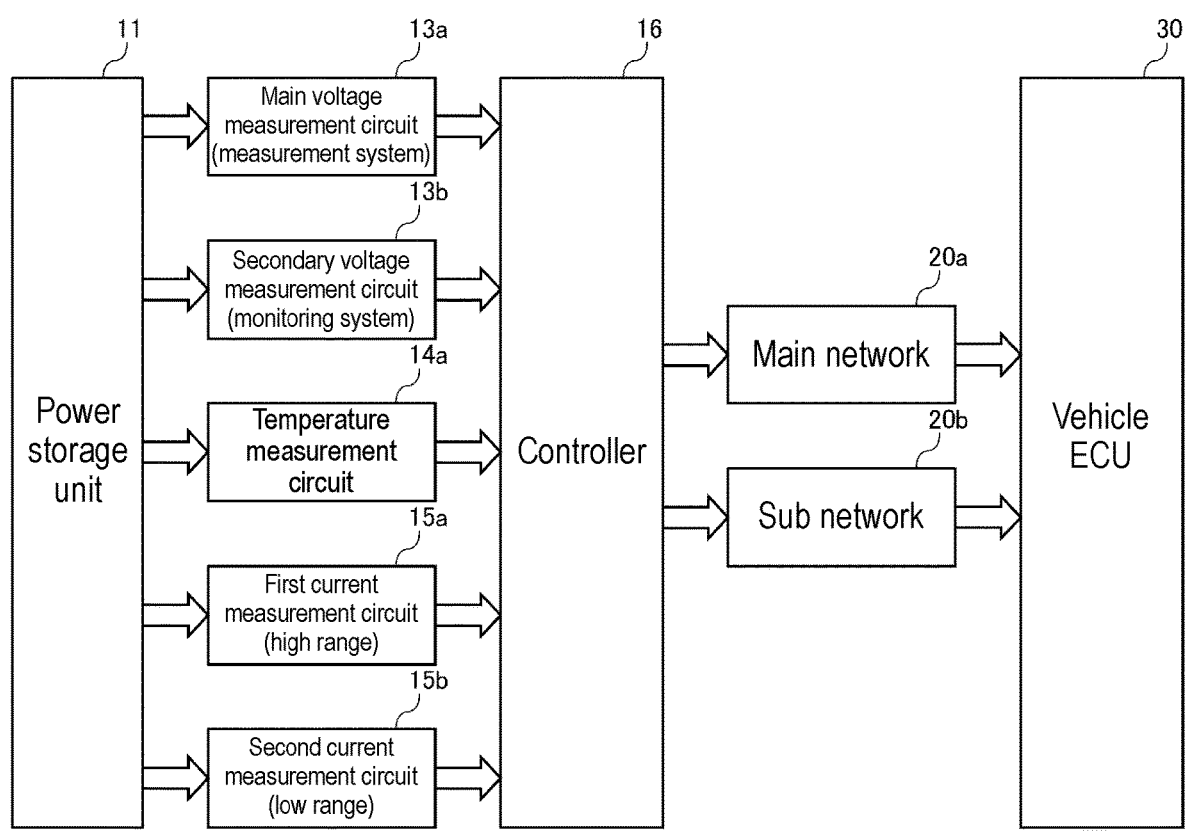
FIG. 5 is a block diagram illustrating a specific example of a redundant configuration of the power supply system, the in-vehicle network, and the vehicle electronic control unit (ECU), illustrated in FIG. 1.

Specifically, as described above, the SOC can be estimated by combining the OCV method and the current integration method, and the SOC also can be estimated by only one of the OCV method and the current integration method. Additionally, the OCV method uses voltage measurement unit 13 that measures OCV and has a redundant configuration, and the current integration method uses current measurement unit 15 that measures a current integrated value and has a redundant configuration. Thus, even when the alternative strategy illustrated in FIG. 5 is executed, the redundant configuration is maintained in a circuit that measures a measurement value for calculating the power limit. For example, even when a circuit anomaly occurs in voltage measurement unit 13, the power limit can be calculated based on a measurement value of current measurement unit 15 having the redundant configuration.

The comparative example has the configuration in which there is no correlation between determination of OV/UV and determination of OT. Thus, when an alternative strategy as in the example is applied to voltage measurement unit 13 by assuming that a circuit anomaly occurs, operation under conditions where no redundant configuration is maintained is allowed. Thus, the configuration of the comparative example is not allowed to use such a configuration from the viewpoint of reliability.

When executing the power limit, vehicle ECU 30 sets the current limit value received from controller 16 of power supply system 10 to inverter 40. When a DC/DC converter (not illustrated) is provided between inverter 40 and first relay RY1 and a current is controlled by the DC/DC converter, vehicle ECU 30 sets the received current limit value to the DC/DC converter. Inverter 40 or the DC/DC converter controls an output current (discharge current from power storage unit 11) within a range of the set current limit value.

At the time of charging from charger 3 to power supply system 10, vehicle ECU 30 sets the current limit value received from controller 16 of power supply system 10 to charger 3 through a communication line (not illustrated). When an AC/DC converter or DC/DC converter is provided between charger 3 and second relay RY2, and a charge current is controlled by the AC/DC converter or the DC/DC converter, vehicle ECU 30 sets the received current limit value to the AC/DC converter or the DC/DC converter.

In the example, the power limit using the SOC-temperature map 16b is used not only for suppressing cell deterioration but also for ensuring safety of electric vehicle 1. In the example, the current limit value may be zero. The current limit value is zero when a cell has a state estimated to be equivalent to a state in which any of overcharging, overdischarging, and overheating has occurred. To ensure safety more, SOC-temperature map 16b may be generated in which the current limit value is zero in a state before the state in which any of overcharging, overdischarging, and overheating has occurred. In this case, vehicle ECU 30 turns off first relay RY1 when the current limit value received from controller 16 of power supply system 10 is zero.

In the example, when a circuit that implements a cell protection function (specifically, voltage measurement unit 13, temperature measurement unit 14, or current measurement unit 15) has an anomaly, controller 16 executes an alternative strategy and notifies vehicle ECU 30 of a transfer request to a degenerate mode.

For in-vehicle applications, a redundant configuration is typically used for voltage measurement unit 13 in many cases. Current measurement unit 15 also uses a redundant configuration in many cases. As an alternative strategy, operation is continued using a redundant function when an anomaly occurs in a main function of the redundant configuration. When an anomaly occurs in the redundant function of the redundant configuration, the operation is continued using only the main function. When an anomaly occurs in both the main function and the redundant function of the redundant configuration, an alternative value is generated based on a value measured by another measurement circuit and the operation is continued. In any case, the measurement circuit is not in a perfect state, so that electric vehicle 1 is transferred to the degenerate mode to improve safety, and accordingly compensating reduced reliability of the measurement circuit. Specific examples of the alternative strategy and the degenerate mode will be described later.

FIG. 3 is a flowchart for illustrating a protection function of power supply system 10 according to a comparative example. When a power supply of electric vehicle 1 is turned on (corresponding to ignition-on of an engine vehicle), controller 16 acquires the voltage, temperature, and current of the plurality of cells E1 to En measured by voltage measurement unit 13, temperature measurement unit 14, and current measurement unit 15, respectively (S11). When the measurement circuit has an anomaly (Y in S12), controller 16 notifies vehicle ECU 30 of the relay cut off request signal (S15). When the measurement circuit has no anomaly (N in S12), controller 16 estimates the SOC of the plurality of cells E1 to En based on the acquired voltage and current (S13).

Controller 16 compares the acquired voltage with the OV threshold value, the acquired voltage with the UV threshold value, and the acquired temperature with the OT threshold value (S14). When overcharge, overdischarge, or overheat is detected (Y in S14), controller 16 notifies vehicle ECU 30 of the relay cut off request signal (S15). When overcharge, overdischarge, or overheat is not detected (N in S14), processing proceeds to step S11, and the processing after step S11 is repeated.

When receiving the relay cut off request signal from controller 16 of power supply system 10, vehicle ECU 30 turns off first relay RY1 and executes relay cut off (S16).

Figure 4:
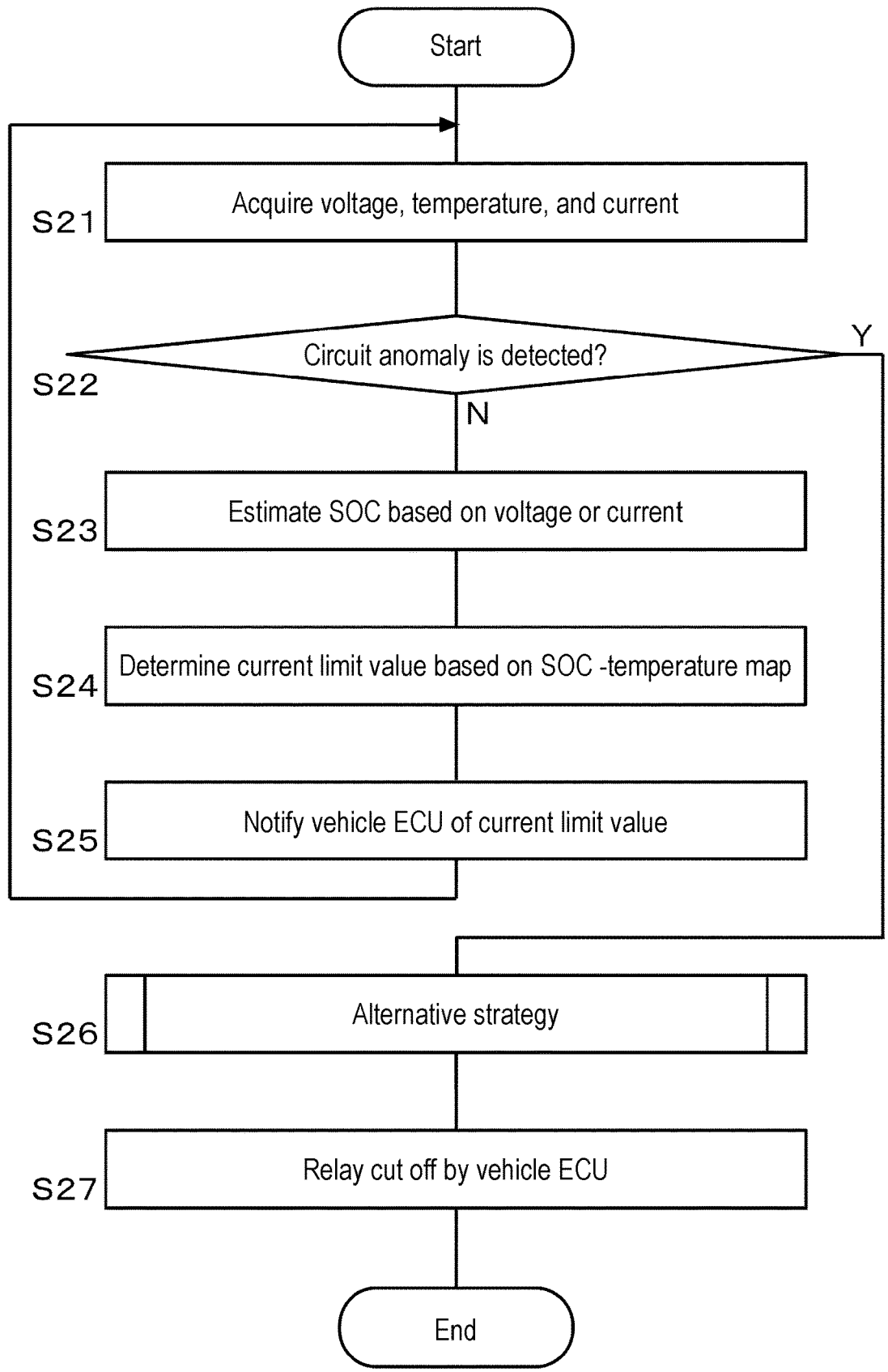
FIG. 4 is a flowchart for illustrating a protection function of a power supply system according to the example.

FIG. 4 is a flowchart for illustrating a protection function of power supply system 10 according to an example. When a power supply of electric vehicle 1 is turned on, controller 16 acquires the voltage, temperature, and current of the plurality of cells E1 to En measured by voltage measurement unit 13, temperature measurement unit 14, and current measurement unit 15, respectively (S21). When the measurement circuit has an anomaly (Y in S22), controller 16 executes an alternative strategy (S26). When finishing the alternative strategy, controller 16 notifies vehicle ECU 30 of the relay cut off request signal (S27).

When the measurement circuit has no anomaly in step S22 (N in S22), controller 16 estimates the SOC of the plurality of cells E1 to En based on the acquired voltage and current (S23). Controller 16 determines the current limit value of each of the cells by referring to SOC-temperature map 16b based on the estimated SOC of the corresponding one of the cells and the temperature of the corresponding one of the cells (S24).

Controller 16 selects the smallest current limit value among determined current limit values of the respective cells, and notifies vehicle ECU 30 of the selected current limit value (S25). Then, the processing proceeds to step S21 and the processing after step S21 is repeated.

FIG. 5 is a block diagram illustrating a specific example of a redundant configuration of power supply system 10, in-vehicle network 20, and vehicle ECU 30, illustrated in FIG. 1. In the example illustrated in FIG. 5, voltage measurement unit 13 includes main voltage measurement circuit 13a of a measurement system and secondary voltage measurement circuit 13b of a monitoring system.

In the present example, both main voltage measurement circuit 13a and secondary voltage measurement circuit 13b use a circuit configuration capable of software control using a processor. For example, the same ASIC is used for main voltage measurement circuit 13a and secondary voltage measurement circuit 13b. Main voltage measurement circuit 13a may use a relatively high-spec ASIC, and secondary voltage measurement circuit 13b may use a relatively low-spec ASIC.

In general, when a circuit anomaly occurs as shown in the comparative example of FIG. 2, i.e., when any one of main voltage measurement circuit 13a and secondary voltage measurement circuit 13b has an anomaly, relay cut off is performed. Thus, the main voltage measurement circuit is often designed with a circuit configuration capable of software control using a processor, and the sub voltage measurement circuit is often designed with a circuit configuration capable of only hardware control without using a processor. In contrast, the present example is configured to continue operation using an alternative strategy, so that main voltage measurement circuit 13a and secondary voltage measurement circuit 13b are each not composed of a circuit capable of only hardware control without using a processor. Anomaly detection with a power limit is determined by using SOC-temperature map 16b as described above in the present example, so that the anomaly detection with a power limit can be continued even with deterioration in reliability of a measured voltage value. Thus, the present example is configured to allow the degenerate mode to be used by using together the anomaly detection with a power limit.

Temperature measurement unit 14 includes temperature measurement circuit 14a. Current measurement unit 15 includes first current measurement circuit 15a in a high range and second current measurement circuit 15b in a low range. First current measurement circuit 15a in a high range uses a differential amplifier and an A/D converter, each having a relatively wider voltage input range than second current measurement circuit 15b in a low range. In general, a differential amplifier and an A/D converter each have a larger offset error as a range widens, so that second current measurement circuit 15b in a low range has higher detection accuracy. In-vehicle network 20 includes main network 20a and sub network 20b.

The configuration of current measurement unit 15 described above is an example, and thus current measurement unit 15 does not necessarily include a current measurement circuit in a high range and a current measurement circuit in a low range. For example, first current measurement circuit 15a and second current measurement circuit 15b may be each composed of the same current sensor, or may be composed of a combination of a current measurement circuit using a Hall element and a current measurement circuit using a shunt resistor.

FIG. 6 is a diagram summarizing alternative strategies and fail-safe actions when power supply system 10 has an anomaly in the example. Examples of an anomaly in both main voltage measurement circuit 13a and secondary voltage measurement circuit 13b (the entire voltage measurement function) include an ASIC power supply anomaly and a serial peripheral interface (SPI) communication anomaly. When an anomaly occurs in the entire voltage measurement function, voltage information on some cells constituting power supply system 10 cannot be obtained. Thus, controller 16 replaces data on the ASIC having an anomaly has occurred with data on another normal ASIC as an alternative strategy, and calculates the power limit described above. The power limit is not calculated only using a voltage value, so that an abnormal state of power supply system 10 can be detected from another parameter even with deterioration in reliability of some data. Battery system 10 mounted on electric vehicle 1 has several hundred volts, so that many cells are connected in series. A number of cells (measurement unit) for which one ASIC measures voltages is generally 10 to 20. Thus, one power supply system 10 is provided with a plurality of ASICs. Even when an anomaly occurs in an ASIC of any measurement unit (both main voltage measurement circuit 13a and secondary voltage measurement circuit 13b), only a measurement value of the ASIC cannot be used, and thus a measurement value of a normal ASIC of another measurement unit can be used.

Then, controller 16 executes transition to the degenerate mode as a fail-safe action to compensate for deterioration in reliability. As the degenerate mode, for example, a SOC usage range of a cell is limited. For example, when the SOC usage range in a normal mode is 20% to 80%, the SOC range in the degenerate mode is limited to 40% to 60%. Additionally, as the degenerate mode, for example, a predetermined offset value is added to a current value measured by current measurement unit 15. A positive offset value is added for charging and a negative offset value is added for discharging. For the offset value, a value determined in advance by the battery manufacturer based on numerical simulations and experiments is used. The offset value may be a fixed value or a variable value in accordance with a measured current value. For example, the offset value may be a value obtained by multiplying a measured current value by a constant rate.

This allows controller 16 to estimate the SOC based on a current value with an absolute value larger than a current actually flowing. Thus, the estimated SOC by controller 16 is smaller at the time of discharging and larger at the time of charging than an actual SOC. This allows the charging and the discharging to easily reach an upper limit value and a lower limit value of the SOC, respectively.

As the degenerate mode, controller 16 multiplies the estimated SOC by a predetermined coefficient. For charging, a coefficient more than one is multiplied, and for discharging, a coefficient less than one is multiplied. For charging, a coefficient less than one may be multiplied, and for discharging, a coefficient more than one may be multiplied. For the coefficients for charging and discharging, values determined in advance by the battery manufacturer based on numerical simulations and experiments are used. When the SOC is multiplied by a predetermined coefficient, the estimated SOC by controller 16 is smaller at the time of discharging and larger at the time of charging than the actual SOC. This allows the charging and the discharging to easily reach an upper limit value and a lower limit value of the SOC, respectively. Instead of multiplying the estimated SOC by a predetermined coefficient, a positive offset may be added for charging and a negative offset may be added for discharging.

The degenerate mode is performed on both power supply system 10 and vehicle ECU 30. For example, vehicle ECU 30 executes processing of limiting an SOC usage range of a cell described above. For example, vehicle ECU 30 also executes power limit control based on a current limit value transmitted from controller 16 as essential control. For example, power supply system 10 executes processing of adding a predetermined offset value to the measured current value described above and/or processing of multiplying the estimated SOC described above by a predetermined coefficient. In the degenerate mode, the current value and SOC transmitted from controller 16 of power supply system 10 to vehicle ECU 30 may be an original measured value or an estimated value, or a measured value or an estimated value subjected to the above processing.

FIG. 7 is a flowchart for illustrating a protection function of power supply system 10 after transition to an alternative strategy caused when an anomaly occurs throughout a voltage measurement function. Controller 16 acquires the voltage, temperature, and current of the plurality of cells E1 to En measured by voltage measurement unit 13, temperature measurement unit 14, and current measurement unit 15, respectively (S261). During a period where yet another measurement circuit has no anomaly after the alternative strategy is executed (N in S262), controller 16 replaces a voltage value of each of main voltage measurement circuit 13*a* and secondary voltage measurement circuit 13*b* of a failed measurement unit with a voltage value measured by voltage measurement unit 13 of another normal measurement unit (S263). Controller 16 limits the SOC usage range of the cell as a fail-safe action (S264).

Controller 16 estimates an SOC of each of the plurality of cells E1 to En based on the acquired or replaced voltage and the acquired current (S265). Controller 16 determines a current limit value of each of the cells by referring to SOC-temperature map 16*b* based on the estimated SOC of the corresponding one of the cells and the temperature of the corresponding one of the cells (S266). Controller 16 selects the smallest current limit value among determined current limit values of the cells, and notifies vehicle ECU 30 of the selected current limit value (S267). Then, processing proceeds to step S261 and the processing after step S261 is repeated. When another measurement circuit has an anomaly in step S262 (Y in S262), the alternative strategy is terminated.

As described above, even when an anomaly occurs in the entire voltage measurement function of a certain measurement unit, replacement of a voltage value with a voltage value measured by voltage measurement unit 13 of another normal measurement unit as an alternative strategy enables electric vehicle 1 to continue to travel within a range of the degenerate mode. Transition to the degenerate mode allows electric vehicle 1 to be operated according to a standard requiring higher safety, so that deterioration in reliability due to the anomaly of the voltage measurement function can be compensated. This enables ensuring both safety of electric vehicle 1 and convenience of a user when an anomaly occurs in the entire voltage measurement function. In contrast, when an anomaly occurs in the entire voltage measurement function in the comparative example, relay cut off is performed. Thus, electric vehicle 1 cannot travel, so that convenience of a user is impaired.

Return to FIG. 6. Examples of an anomaly of main voltage measurement circuit 13*a* include an anomaly in that output of an A/D converter sticks. When main voltage measurement circuit 13*a* has an anomaly, controller 16 uses data measured by secondary voltage measurement circuit 13*b* as an alternative strategy.

When main voltage measurement circuit 13*a* has an anomaly, data measured by main voltage measurement circuit 13*a* and data measured by secondary voltage measurement circuit 13*b* cannot be compared with each other, and thus reliability of the data is deteriorated.

Controller 16 executes transition to the degenerate mode as a fail-safe action. As the degenerate mode, for example, vehicle ECU 30 executes the processing of limiting the SOC usage range of the cell described above. For example, vehicle ECU 30 also executes power limit control based on a current limit value transmitted from controller 16 as essential control.

Even when main voltage measurement circuit 13*a* has an anomaly as described above, electric vehicle 1 can continue to travel within the range of the degenerate mode by using the data measured by secondary voltage measurement circuit 13*b* as an alternative strategy. This enables ensuring both safety of electric vehicle 1 and convenience of a user when main voltage measurement circuit 13*a* has an anomaly.

In contrast, the comparative example is often configured to use a circuit configuration in which secondary voltage measurement circuit 13*b* is capable of only hardware control without using a processor. In this case, when main voltage measurement circuit 13*a* has an anomaly, transition to the degenerate mode cannot be executed. In this regard, the present example includes secondary voltage measurement circuit 13*b* that uses a circuit configuration capable of software control using a processor, so that secondary voltage measurement circuit 13*b* can substitute for the function of main voltage measurement circuit 13a. This enables electric vehicle 1 to continue to travel within the range of the degenerate mode.

Examples of an anomaly of secondary voltage measurement circuit 13b include an anomaly in that output of an A/D converter sticks. When secondary voltage measurement circuit 13b has an anomaly, controller 16 continues to use data measured by main voltage measurement circuit 13a in a state where data measured by secondary voltage measurement circuit 13b cannot be acquired.

Even when secondary voltage measurement circuit 13b has an anomaly, the data measured by main voltage measurement circuit 13a and the data measured by secondary voltage measurement circuit 13b cannot be compared with each other, and thus reliability of the data is deteriorated.

Controller 16 executes transition to the degenerate mode as a fail-safe action. As the degenerate mode, for example, vehicle ECU 30 executes the processing of limiting the SOC usage range of the cell described above. For example, vehicle ECU 30 also executes power limit control based on a current limit value transmitted from controller 16 as essential control.

Even when secondary voltage measurement circuit 13b has an anomaly as described above, electric vehicle 1 can continue to travel within the range of the degenerate mode. This enables ensuring both safety of electric vehicle 1 and convenience of a user when secondary voltage measurement circuit 13b has an anomaly.

Examples of an anomaly of temperature measurement circuit 14a include output sticking of a thermistor and an output drift anomaly. When temperature measurement circuit 14a has an anomaly, controller 16 replaces temperature estimated using abnormal thermistor output with temperature estimated using normal thermistor output as alternative strategy 1. Controller 16 uses a measurement value of an abnormal thermistor by adding an offset value to the measurement value as alternative strategy 2. When abnormal thermistors include an abnormal thermistor exhibiting behavior identical to that of a normal thermistor, controller 16 replaces a measurement value of the abnormal thermistor with a measurement value of the normal thermistor identical in behavior as alternative strategy 3.

When one of a plurality of thermistors has an anomaly and there is no change in temperature distribution estimated from measurement values of the other thermistors, controller 16 executes alternative strategy 1. When one of the plurality of thermistors has an anomaly and there is a change in temperature distribution estimated from measurement values of the other thermistors, controller 16 executes alternative strategy 2.

Figure 8:
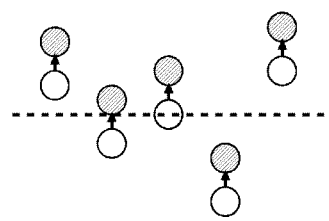
FIG. 8 is a diagram for illustrating a first specific example of alternative strategy 2 when a temperature measurement circuit has an anomaly.

FIG. 8 is a diagram for illustrating a first specific example of alternative strategy 2 when temperature measurement circuit 14a has an anomaly. When one of the plurality of thermistors has an anomaly, controller 16 adds a predetermined offset value to each of measurement values of the plurality of thermistors. For the offset value, a value determined in advance by the battery manufacturer based on numerical simulations and experiments is used. In the first specific example, an offset with an identical value is uniformly added to each of measurement values of all the thermistors.

Figure 9:
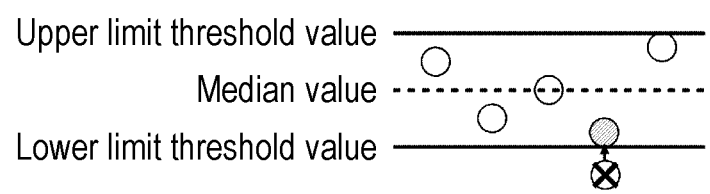
FIG. 9 is a diagram for illustrating a second specific example of alternative strategy 2 when the temperature measurement circuit has an anomaly.

FIG. 9 is a diagram for illustrating a second specific example of alternative strategy 2 when temperature measurement circuit 14a has an anomaly. When one of the plurality of thermistors has an anomaly, controller 16 calculates a median value of measurement values of the plurality of thermistors. Instead of the median value, an average value may be calculated. Controller 16 identifies a measurement value out of a predetermined range centered on the median value. Controller 16 adds an offset value only to the identified measurement value. As the offset value, a predetermined fixed value may be used, or a variable value may be used. As the variable value, for example, an average value of deviations between the median value and respective measurement values may be used.

This allows controller 16 to determine a current limit value with reference to SOC-temperature map 16b based on a temperature higher than an actually measured temperature. SOC-temperature map 16b sets an absolute value of a current limit value that decreases as temperature increases. Thus, when the current limit value is determined based on the temperature higher than the actually measured temperature, a more suppressive current limit value is selected.

Controller 16 executes transition to the degenerate mode as a fail-safe action. As the degenerate mode, for example, vehicle ECU 30 executes the processing of limiting the SOC usage range of the cell described above. For example, vehicle ECU 30 also executes power limit control based on a current limit value transmitted from controller 16 as essential control.

Even when temperature measurement circuit 14a has an anomaly as described above, electric vehicle 1 can continue to travel within the range of the degenerate mode by executing any of alternative strategies 1 to 3 described above. This enables ensuring both safety of electric vehicle 1 and convenience of a user when temperature measurement circuit 14a has an anomaly. In contrast, when one of the plurality of thermistors has an anomaly in the comparative example, relay cut off is performed, and thus electric vehicle 1 cannot travel. In this regard, the present example enables electric vehicle 1 to continue to travel within the range of the degenerate mode.

Return to FIG. 6. Examples of an anomaly in both first current measurement circuit 15a and second current measurement circuit 15b (the entire current measurement function) include power failure of a current sensor (e.g., Hall element, differential amplifier, A/D converter). When an anomaly occurs in the entire current measurement function, controller 16 uses an SOC estimated by the OCV method as an alternative strategy.

Controller 16 executes transition to the degenerate mode as a fail-safe action. As the degenerate mode, for example, a SOC usage range of a cell is limited. Additionally, as the degenerate mode, for example, a predetermined offset value is added to a voltage value measured by voltage measurement unit 13. A positive offset value is added for charging and a negative offset value is added for discharging. For the offset value, a value determined in advance by the battery manufacturer based on numerical simulations and experiments is used. The offset value may be a fixed value or a variable value in accordance with a measured voltage value. For example, the offset value may be a value obtained by multiplying the measured voltage value by a constant rate. This allows controller 16 to use a cell voltage that is lower than actual cell voltage during discharge and higher during charging. Thus, the cell voltage is likely to reach the UV threshold value or the OV threshold value.

The degenerate mode is performed on both power supply system 10 and vehicle ECU 30. For example, vehicle ECU 30 executes processing of limiting an SOC usage range of a cell described above. For example, vehicle ECU 30 also executes power limit control based on a current limit value transmitted from controller 16 as essential control. For example, power supply system 10 executes processing of adding a predetermined offset value to the measured voltage value described above. In the degenerate mode, the voltage value transmitted from controller 16 of power supply system 10 to vehicle ECU 30 may be an original measured value or a measured value subjected to the above processing.

Figure 10:
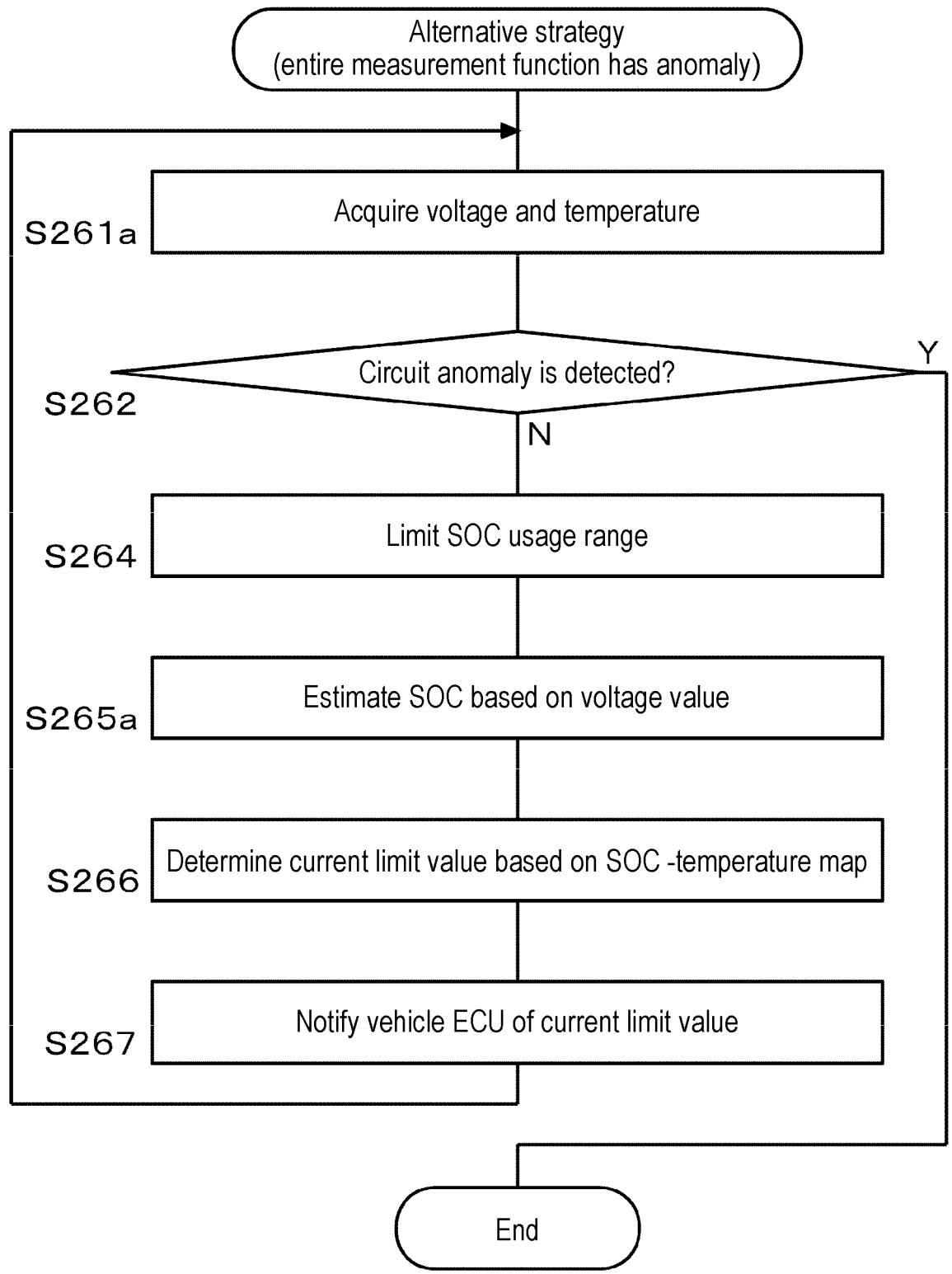
FIG. 10 is a flowchart for illustrating a protection function of a power supply system after transition to an alternative strategy caused when an anomaly occurs throughout a current measurement function.

FIG. 10 is a flowchart for illustrating a protection function of power supply system 10 after transition to an alternative strategy caused when an anomaly occurs throughout a current measurement function. Controller 16 acquires voltages and temperatures of the plurality of cells E1 to En measured by voltage measurement unit 13 and temperature measurement unit 14, respectively (S261a). During a period where yet another measurement circuit has no anomaly after the alternative strategy is executed (N in S262), controller 16 limits the SOC usage range of each of the cells as a fail-safe action (S264).

Controller 16 estimates an SOC of each of the plurality of cells E1 to En based on the acquired voltage values (S265a). For example, the SOC can be estimated by the OCV method. Controller 16 determines a current limit value of each of the cells by referring to SOC-temperature map 16b based on the estimated SOC of the corresponding one of the cells and the temperature of the corresponding one of the cells (S266). Controller 16 selects the smallest current limit value among determined current limit values of the cells, and notifies vehicle ECU 30 of the selected current limit value (S267). Then, processing proceeds to step S261 and the processing after step S261 is repeated. When another measurement circuit has an anomaly in step S262 (Y in S262), the alternative strategy is terminated.

As described above, even when an anomaly occurs in the entire current measurement function, estimation of the SOC based on the voltage value, and determination of the current limit value based on the SOC and the temperature, as an alternative strategy, enable electric vehicle 1 to continue to travel within the range of the degenerate mode. This enables ensuring both safety of electric vehicle 1 and convenience of a user when an anomaly occurs in the entire current measurement function.

Return to FIG. 6. Examples of an anomaly of first current measurement circuit 15a in a high range include output sticking of a current sensor and an offset anomaly of the current sensor. When first current measurement circuit 15a in a high range has an anomaly, controller 16 uses data measured by second current measurement circuit 15b in a low range, and limits a range of input-output current of power storage unit 11 to an input range of second current measurement circuit 15b in a low range, as an alternative strategy. In a specific example, controller 16 notifies vehicle ECU 30 to limit the range of input-output current of power storage unit 11 to the input range of second current measurement circuit 15b in a low range. Vehicle ECU 30 sets an upper limit current value and a lower limit current value corresponding to the input range received from controller 16 of power supply system 10 in inverter 40.

Figure 11:
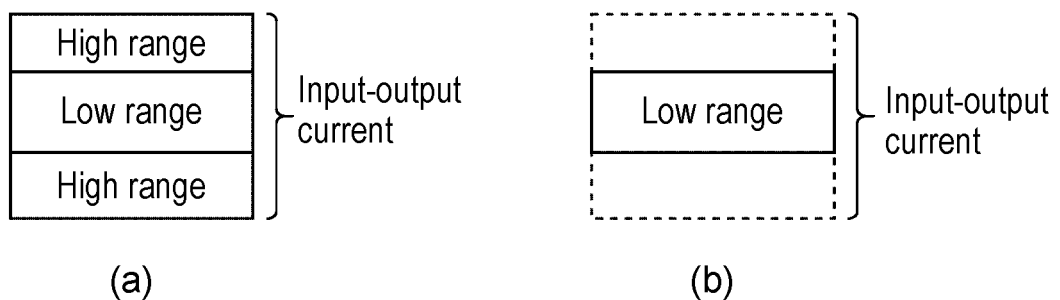
FIGS. 11(*a*) and 11(*b*) are each a diagram for illustrating an alternative strategy when a first current measurement circuit has an anomaly.

FIGS. 11(a) and 11(b) are each a diagram for illustrating an alternative strategy when first current measurement circuit 15a has an anomaly. FIG. 11(a) illustrates the input-output current before the anomaly occurs in first current measurement circuit 15a, and FIG. 11(b) illustrates the input-output current after the anomaly occurs in first current measurement circuit 15a. As illustrated in FIGS. 11(a) and 11(b), when first current measurement circuit 15a in a high range has an anomaly, a current in a range acquired by excluding a low range measurable by second current measurement circuit 15b from a high range measurable by first current measurement circuit 15a cannot be measured. Thus, the input-output current of power storage unit 11 needs to be limited in the low range measurable by second current measurement circuit 15b.

When first current measurement circuit 15a in a high range has an anomaly, data measured by first current measurement circuit 15a in a high range cannot be compared with data measured by second current measurement circuit 15b in a low range, and thus reliability of the data deteriorates.

Controller 16 executes transition to the degenerate mode as a fail-safe action. As the degenerate mode, for example, vehicle ECU 30 executes the processing of limiting the SOC usage range of the cell described above. For example, vehicle ECU 30 also executes power limit control based on a current limit value transmitted from controller 16 as essential control.

Even when first current measurement circuit 15a has an anomaly as described above, data measured by second current measurement circuit 15b is used while the input-output current of power storage unit 11 is limited to the low range measurable by second current measurement circuit 15b, as an alternative strategy, and thus electric vehicle 1 can continue to travel within the range of the degenerate mode. This enables ensuring both safety of electric vehicle 1 and convenience of a user when first current measurement circuit 15a has an anomaly.

Return to FIG. 6. Examples of an anomaly of second current measurement circuit 15b in a low range include output sticking of a current sensor and an offset anomaly of the current sensor. When second current measurement circuit 15b in a low range has an anomaly, controller 16 uses only data measured by first current measurement circuit 15a in a high range as an alternative strategy.

Figure 12:
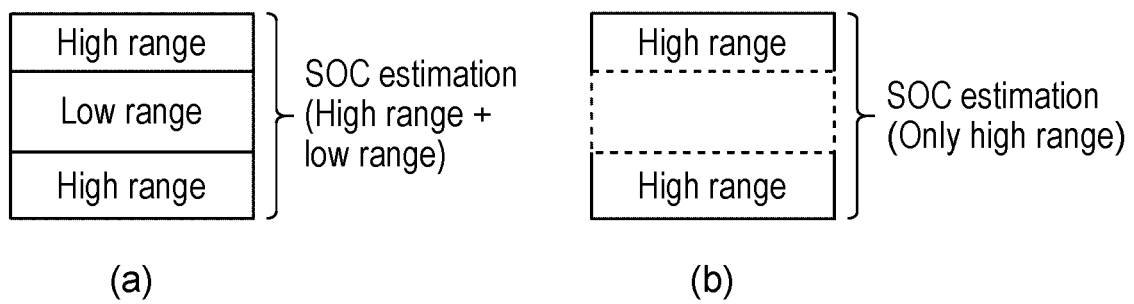
FIGS. 12(*a*) and 12(*b*) are each a diagram for illustrating an alternative strategy when a second current measurement circuit has an anomaly.

FIGS. 12(a) and 12(b) are each a diagram for illustrating an alternative strategy when second current measurement circuit 15b has an anomaly. FIG. 12(a) illustrates SOC estimation before the anomaly occurs in second current measurement circuit 15b, and FIG. 12(b) illustrates the SOC estimation after the anomaly occurs in second current measurement circuit 15b. As illustrated in FIGS. 12(a) and 12(b), when second current measurement circuit 15b in a low range has an anomaly, the SOC is estimated based on a current value measured by first current measurement circuit 15a in a high range. When second current measurement circuit 15b is normal and a current value is within the input range of second current measurement circuit 15b, using a current value measured by second current measurement circuit 15b more increases estimation accuracy of the SOC.

When first current measurement circuit 15a in a high range has an anomaly, data measured by first current measurement circuit 15a in a high range cannot be compared with data measured by second current measurement circuit 15b in a low range, and thus reliability of the data deteriorates.

Controller 16 executes transition to the degenerate mode as a fail-safe action. As the degenerate mode, for example, vehicle ECU 30 executes the processing of limiting the SOC usage range of the cell described above. For example, vehicle ECU 30 also executes power limit control based on a current limit value transmitted from controller 16 as essential control.

Even when second current measurement circuit 15b has an anomaly as described above, electric vehicle 1 can continue to travel within the range of the degenerate mode by estimating the SOC based on a current value measured by first current measurement circuit 15a as an alternative strategy. This enables ensuring both safety of electric vehicle 1 and convenience of a user when second current measurement circuit 15*b* has an anomaly.

Return to FIG. 6. Examples of an anomaly of controller 16 include an anomaly in a CPU. The anomaly in the CPU includes an anomaly in an ALU, an anomaly in a ROM, and an anomaly in a RAM. When controller 16 has an anomaly, relay cut off under hardware control is executed. When receiving a hardware stop signal from management unit 12 of power supply system 10, vehicle ECU 30 turns off first relay RY1 and executes the relay cut off. When controller 16 has an anomaly, controller 16 cannot detect an anomaly of a cell, and then CAN communication between controller 16 and vehicle ECU 30 also cannot be performed. Thus, when controller 16 has an anomaly, relay cut off is used as in the comparative example.

Examples of an anomaly in main network 20*a* include disconnection of a CAN bus and communication timeout. When main network 20*a* has an anomaly, controller 16 notifies vehicle ECU 30 of various data only through sub network 20*b* as an alternative strategy. Vehicle ECU 30 controls electric vehicle 1 based on the data received through sub network 20*b*. Vehicle ECU 30 lights a caution lamp in instrument panel 60, the caution lamp indicating an anomaly in in-vehicle network 20. When main network 20*a* has an anomaly, vehicle ECU 30 may or may not transfer to the degenerate mode. Regular data is transmitted to vehicle ECU 30 from power supply system 10, so that only lighting of the caution lamp may be performed.

Examples of an anomaly in sub network 20*b* include disconnection of a CAN bus and communication timeout. When sub network 20*b* has an anomaly, controller 16 notifies vehicle ECU 30 of various data only through main network 20*a* as an alternative strategy. Vehicle ECU 30 controls electric vehicle 1 based on the data received through main network 20*a*. Vehicle ECU 30 lights a caution lamp in instrument panel 60, the caution lamp indicating an anomaly in in-vehicle network 20. When sub network 20*b* has an anomaly, vehicle ECU 30 may or may not transfer to the degenerate mode. Regular data is transmitted to vehicle ECU 30 from power supply system 10, so that only lighting of the caution lamp may be performed.

The present example includes secondary voltage measurement circuit 13*b* that uses a circuit configuration capable of software control using a processor, so that secondary voltage measurement circuit 13*b* does not directly control main network 20*a* or sub network 20*b* to stop hardware.

As described above, according to the present exemplary embodiment, when the measurement circuit has an anomaly, the alternative strategy is executed together with transition to the degenerate mode without performing the relay cut off. This enables ensuring both safety of electric vehicle 1 and convenience of a user. This is especially effective in pure electric vehicles (EVs) equipped with no engine.

When safety control corresponding to determination of each of the voltage and temperature, using a threshold value, is incorporated into power limit control, the control can be unified and simplified as compared with when the safety control by determination of each of the voltage and temperature, using a threshold value, and the power limit control coexist. At a stage prior to relay cut off, stepwise current limiting also enables safety to be ensured.

Conventional power limit control is intended only to suppress cell deterioration, and ensuring safety is left to OV/UV determination and OT determination. In contrast, the power limit control according to the present exemplary embodiment can achieve suppression of cell deterioration, ensuring safety, and ensuring degenerate traveling time. The power limit control also enables preventing the relay cut off from being suddenly activated by detection of OV, UV, or OT, and ensuring the degenerate traveling time while ensuring the safety at the stage prior to the relay cut off.

The present invention has been described above based on the exemplary embodiment. The exemplary embodiment is exemplified, and it is understood by those skilled in the art that various modifications are available for combinations of each of components of the exemplary embodiment and each of processing processes thereof, and that such modifications are also within the scope of the present invention.

In the exemplary embodiment described above, an example of determining a current limit value based on SOC-temperature map 16*b* is described. In this regard, the current limit value derived based on SOC-temperature map 16*b* may be corrected based on the SOH and/or internal resistance. This correction algorithm is also created by the battery manufacturer for each type of battery. In an algorithm that determines a current limit value based on SOC-temperature map 16*b*, processing of setting the current limit value to zero when the cell voltage exceeds the OV threshold value or when the cell voltage falls below the UV threshold value may be incorporated. The OV threshold value may be lower than the OV threshold value used in the control according to the comparative example. The UV threshold value may be higher than the UV threshold value used in the control according to the comparative example.

In the exemplary embodiment described above, limitation of the SOC usage range of a cell is mainly described as the degenerate mode executed by vehicle ECU 30. In this regard, the degenerate mode can be controlled in various ways determined by a vehicle manufacturer. For example, a predetermined upper limit speed may be set for traveling of electric vehicle 1.

The exemplary embodiment may be specified by the following items.

Item 1

Power supply system (10) that is mounted on electric vehicle (1), and that includes power storage unit (11) connected to a plurality of cells (E1 to En), voltage measurement unit (13) that measures a voltage of each of the plurality of cells (E1 to En), current measurement unit (15) that measures a current flowing through each of the plurality of cells (E1 to En), temperature measurement unit (14) that measures a temperature of each of the plurality of cells (E1 to En), and controller (16) that determines a current limit value defining an upper limit of a current for suppressing cell deterioration and ensuring safety based on the voltage, the current, and the temperature of each of the plurality of cells (E1 to En) measured by voltage measurement unit (13), current measurement unit (15), and temperature measurement unit (14), respectively, and that notifies higher-level controller (30) in electric vehicle (1) of the determined current limit value.

This enables both suppressing cell deterioration and ensuring safety to be achieved by using the current limit value.

Item 2

Power supply system (10) described in Item 1, wherein controller (16) estimates a state of charge (SOC) of each of the plurality of cells based on the voltage of the corresponding one of the cells measured by voltage measurement unit (13) and the current of the corresponding one of the cells measured by current measurement unit (15), and determines the current limit value based on the estimated SOC and the temperature measured by temperature measurement unit (14).

This enables the current limit value to be determined based on the SOC and the temperature.

Item 3

Power supply system (10) described in Item 2, wherein when voltage measurement unit (13) of a certain measurement unit among the plurality of cells (E1 to En) has an anomaly, controller (16) replaces a voltage of a cell included in the certain measurement unit with a voltage measured by voltage measurement unit (13) of another normal measurement unit.

This enables the current limit value to be obtained, even when voltage measurement unit (13) of a certain measurement unit has an anomaly, by using a value of voltage measurement unit (13) of another normal measurement unit as a substitute.

Item 4

Power supply system (10) described in Item 3, wherein controller (16) adds a positive offset value to an absolute value of a current measured by current measurement unit (15) when voltage measurement unit (13) has an anomaly.

This enables need criteria for safety to be raised by adding the positive offset value to the absolute value of the measured current when voltage measurement unit (13) has an anomaly.

Item 5

Power supply system (10) described in Item 3, wherein controller (16) multiplies the estimated SOC by a positive coefficient less than one when voltage measurement unit (13) has an anomaly during discharge from power storage unit (11), and multiplies the estimated SOC by a positive coefficient more than one when voltage measurement unit (13) has an anomaly during charge on power storage unit (11).

This enables need criteria for safety to be raised by multiplying the estimated SOC by a coefficient when voltage measurement unit (13) has an anomaly.

Item 6

Power supply system (10) described in Item 1, wherein controller (16) estimates an SOC of each of the plurality of cells based on a voltage of the corresponding one of the cells measured by voltage measurement unit (13) when current measurement unit (15) has an anomaly, and determines the current limit value based on the estimated SOC and the temperature measured by the temperature measurement unit.

This enables electric vehicle (1) to continue to travel within the range of the degenerate mode by changing a method for detecting an anomaly of a cell when current measurement unit (15) has an anomaly.

Item 7

Power supply system (10) described in Item 6, wherein controller (16) adds a negative offset value to the voltage measured by voltage measurement unit (13) when current measurement unit (15) has an anomaly during discharge from power storage unit (11), and adds a positive offset value to the voltage measured by voltage measurement unit (13) when current measurement unit (15) has an anomaly during charge on power storage unit (11).

This enables need criteria for safety to be raised by adding an offset value to the measured voltage when current measurement unit (15) has an anomaly.

Item 8

Power supply system (10) described in any one of Items 3 to 7, wherein controller (16) narrows a usage range of SOCs of the plurality of cells (E1 to En).

This enables safety of power supply system (10) to be improved, and deterioration in reliability of a measurement function to be compensated.

Item 9

Management device (12) that is provided in power supply system (10) for a vehicle and that includes voltage measurement unit (13) that measures a voltage of each of a plurality of cells (E1 to En) provided in power storage unit (11) provided in the power supply system for a vehicle, current measurement unit (15) that measures a current flowing through each of the plurality of cells (E1 to En), temperature measurement unit (14) that measures a temperature of each of the plurality of cells (E1 to En), and controller (16) that calculates a current limit value defining an upper limit of a current for suppressing cell deterioration and ensuring safety based on the voltage, the current, and the temperature of each of the plurality of cells (E1 to En) measured by voltage measurement unit (13), current measurement unit (15), and temperature measurement unit (14), respectively, and that notifies higher-level controller (30) in electric vehicle (1) of the calculated current limit value.

This enables both suppressing cell deterioration and ensuring safety to be achieved by using the current limit value.

REFERENCE MARKS IN THE DRAWINGS

1: electric vehicle
2: commercial power system
3: charger
4: charging cable
10: power supply system
11: power storage unit
12: management unit
13: voltage measurement unit
13a: main voltage measurement circuit
13b: secondary voltage measurement circuit
14: temperature measurement unit
14a: temperature measurement circuit
15: current measurement unit
15a: first current measurement circuit
15b: second current measurement circuit
16: controller
16a: SOC-OCV map
16b: SOC-temperature map
E1-En: cell
Rs: shunt resistor
T1, T2: temperature sensor
20: in-vehicle network
20a: main network
20b: sub network
30: vehicle ECU 40: inverter
50: motor
60: instrument panel
RY1: first relay
RY2: second relay

The invention claimed is:

1. A management device provided in a power supply system for a vehicle, the management device comprising:
a voltage measurement unit that measures a voltage of each of a plurality of cells provided in a power storage unit provided in the power supply system for a vehicle;
a current measurement unit that measures a current flowing through the plurality of cells;
a temperature measurement unit that measures a temperature of at least one of the plurality of cells; and
a controller that determines a current limit value calculating an upper limit of a current for suppressing cell deterioration and ensuring safety based on the voltage measured by the voltage measurement unit, the current measured by the current measurement unit, and the temperature measured by the temperature measurement unit, and that notifies a higher-level controller in an electric vehicle of the calculated current limit value,
wherein the controller estimates a state of charge (SOC) of each of the plurality of cells by either or both of:
an open circuit voltage (OCV) method in which the SOC is estimated in relation to a voltage of the each of the plurality of cells measured by the voltage measurement unit, and
a current integration method in which the SOC is estimated in relation to a current of the plurality of cells measured by the current measurement unit,
wherein the controller determines the current limit value using a map or function relating the current limit value with both of the estimated SOC and the temperature measured by the temperature measurement unit,
wherein the higher-level controller limits a discharge current from, and/or a charge current into, the power storage unit so as not to exceed the determined current limit value,
wherein when the voltage measurement unit of a certain measurement unit among the plurality of cells has an anomaly, the controller replaces a voltage of a cell included in the certain measurement unit with a voltage measured by the voltage measurement unit of another normal measurement unit, and,
wherein the controller obtains a modulated current by adding a positive offset value to an absolute value of the current measured by the current measurement unit when the voltage measurement unit has an anomaly, wherein said current is replaced with the modulated current in estimating the SOC by the current integration method.

2. A power supply system mounted on an electric vehicle, the power supply system comprising:
a power storage unit including the plurality of cells connected to each other; and
the management device according to claim 1.

3. A management device provided in a power supply system for a vehicle, the management device comprising:
a voltage measurement unit that measures a voltage of each of a plurality of cells provided in a power storage unit provided in the power supply system for a vehicle;
a current measurement unit that measures a current flowing through the plurality of cells;
a temperature measurement unit that measures a temperature of at least one of the plurality of cells; and
a controller that determines a current limit value calculating an upper limit of a current for suppressing cell deterioration and ensuring safety based on the voltage measured by the voltage measurement unit, the current measured by the current measurement unit, and the temperature measured by the temperature measurement unit, and that notifies a higher-level controller in an electric vehicle of the calculated current limit value,
wherein the controller estimates a state of charge (SOC) of each of the plurality of cells by either or both of:
an open circuit voltage (OCV) method in which the SOC is estimated in relation to a voltage of the each of the plurality of cells measured by the voltage measurement unit, and
a current integration method in which the SOC is estimated in relation to a current of the plurality of cells measured by the current measurement unit,
wherein the controller determines the current limit value using a map or function relating the current limit value with both of the estimated SOC and the temperature measured by the temperature measurement unit,
wherein the higher-level controller limits a discharge current from, and/or a charge current into, the power storage unit so as not to exceed the determined current limit value,
wherein when the voltage measurement unit of a certain measurement unit among the plurality of cells has an anomaly, the controller replaces a voltage of a cell included in the certain measurement unit with a voltage measured by the voltage measurement unit of another normal measurement unit, and
wherein the controller obtains a modulated estimated SOC by multiplying the estimated SOC by a positive coefficient less than one when the voltage measurement unit has an anomaly during discharge from the power storage unit, and multiplying the estimated SOC by a positive coefficient more than one when the voltage measurement unit has an anomaly during charge on the power storage unit, wherein said estimated SOC is replaced with the modulated estimated SOC in determining the current limit value.

4. A power supply system mounted on an electric vehicle, the power supply system comprising:
a power storage unit including the plurality of cells connected to each other; and
the management device according to claim 3.

5. A management device provided in a power supply system for a vehicle, the management device comprising:
a voltage measurement unit that measures a voltage of each of a plurality of cells provided in a power storage unit provided in the power supply system for a vehicle;
a current measurement unit that measures a current flowing through the plurality of cells;
a temperature measurement unit that measures a temperature of at least one of the plurality of cells; and
a controller that determines a current limit value calculating an upper limit of a current for suppressing cell deterioration and ensuring safety based on the voltage measured by the voltage measurement unit, the current measured by the current measurement unit, and the temperature measured by the temperature measurement unit, and that notifies a higher-level controller in an electric vehicle of the calculated current limit value,
wherein the controller estimates a state of charge (SOC) of each of the plurality of cells by either or both of:

an open circuit voltage (OCV) method in which the SOC is estimated in relation to a voltage of the each of the plurality of cells measured by the voltage measurement unit, and a current integration method in which the SOC is estimated in relation to a current of the plurality of cells measured by the current measurement unit, wherein the controller determines the current limit value using a map or function relating the current limit value with both of the estimated SOC and the temperature measured by the temperature measurement unit, wherein the higher-level controller limits a discharge current from, and/or a charge current into, the power storage unit so as not to exceed the determined current limit value, wherein the controller estimates an SOC of each of the plurality of cells by the OCV method when the current measurement unit has an anomaly, and wherein the controller obtains a modulated voltage by adding a negative offset value to the voltage measured by the voltage measurement unit when the current measurement unit has an anomaly during discharge from the power storage unit, and by adding a positive offset value to the voltage measured by the voltage measurement unit when the current measurement unit has an anomaly during charge on the power storage unit, wherein said voltage is replaced with the modulated voltage in estimating the SOC by the OCV method.

6. A power supply system mounted on an electric vehicle, the power supply system comprising:
a power storage unit including the plurality of cells connected to each other; and
the management device according to claim 5.

7. A management device provided in a power supply system for a vehicle, the management device comprising:
a voltage measurement unit that measures a voltage of each of a plurality of cells provided in a power storage unit provided in the power supply system for a vehicle;
a current measurement unit that measures a current flowing through the plurality of cells;
a temperature measurement unit that measures a temperature of at least one of the plurality of cells; and
a controller that determines a current limit value calculating an upper limit of a current for suppressing cell deterioration and ensuring safety based on the voltage measured by the voltage measurement unit, the current measured by the current measurement unit, and the temperature measured by the temperature measurement unit, and that notifies a higher-level controller in an electric vehicle of the calculated current limit value, wherein the controller estimates a state of charge (SOC) of each of the plurality of cells by either or both of:
an open circuit voltage (OCV) method in which the SOC is estimated in relation to a voltage of the each of the plurality of cells measured by the voltage measurement unit, and a current integration method in which the SOC is estimated in relation to a current of the plurality of cells measured by the current measurement unit, wherein the controller determines the current limit value using a map or function relating the current limit value with both of the estimated SOC and the temperature measured by the temperature measurement unit, wherein the higher-level controller limits a discharge current from, and/or a charge current into, the power storage unit so as not to exceed the determined current limit value, wherein when the voltage measurement unit of a certain measurement unit among the plurality of cells has an anomaly, the controller replaces a voltage of a cell included in the certain measurement unit with a voltage measured by the voltage measurement unit of another normal measurement unit, and wherein where at least one of the voltage measurement unit, the current measurement unit, and the temperature measurement unit has an anomaly, the controller narrows a usage range of SOCs of the plurality of cells by executing transition from a normal mode to a degenerate mode in which the usage range of SOCs of the plurality of cells is limited relative to the usage range of SOCs of the plurality of cells in the normal mode.

8. A power supply system mounted on an electric vehicle, the power supply system comprising:
a power storage unit including the plurality of cells connected to each other; and
the management device according to claim 7.

\* \* \* \* \*